UNITED STATES PATENT OFFICE.

GEORGE A. MARSH, JR., OF SANDUSKY, OHIO.

CALCIMINE COMPOSITION AND METHOD OF PREPARING THE SAME.

SPECIFICATION forming part of Letters Patent No. 308,973, dated December 9, 1884.

Application filed January 7, 1884. (Specimens.)

*To all whom it may concern:*

Be it known that I, GEORGE A. MARSH, Jr., of Sandusky, in the county of Erie and State of Ohio, have invented a new and Improved Calcimine Composition and Method of Preparing the Same, of which the following is a full, clear, and exact description.

The object of this invention is to produce a superior calcimine composition, which, when ground and mixed for use, will not set or harden in the pail, and which may be mixed for use in cold water, will spread smooth or easy and be free from cracking, and which will have its ingredients that are mixed together wet thoroughly incorporated and held together.

In the preparation of my improved calcimine or wall-finish, which I term "adamantine," I use the following ingredients, with or without others, in or about the proportions specified: finely-ground plaster, ten pounds; glue, eight ounces; gum-tragacanth, three ounces; water, two gallons. I first dissolve the glue and gum-tragacanth in water, adding about two gallons of hot water, and boil or cook the whole for about ten minutes, then add the plaster, and mix the whole together until the whole becomes a thick pasty mass, which after being dried is ground to a powder. By mixing the plaster with the dissolved glue and gum it forms, when dry, a crayon, and when ground and mixed for use will not set, jell, or harden in the pail or vessel used in working. The glue and gum-tragacanth prepared as described also make the mixture capable of being used in cold water, which is much more convenient and advantageous than mixing the calcimine hot. Glue or plaster alone, or the mixture otherwise prepared than as described, produces a very different composition. The gum-tragacanth strengthens the compound and prevents the glue from cracking and "jelling." It also binds or holds the mass when mixed for use with the water, and makes it spread smooth and easily. By first combining the several ingredients, or dissolving and mixing them together in a wet state, as described, they are more thoroughly incorporated or amalgamated.

I am aware that plaster and glue have been used in calcimining compositions, and therefore do not claim such, broadly, but only when combined with gum-tragacanth, as and for the purpose above described.

Having thus described my invention, I claim as new and desire to secure by Letters Patent—

1. The method herein described of preparing calcimine, consisting in first dissolving glue and gum-tragacanth in water, then boiling or cooking the whole, then adding pulverized plaster to reduce it to a thick pasty mass, then drying the same, and finally reducing it to a powder, as set forth.

2. The within-described calcimine composition, having for its ingredients gum-tragacanth, glue, water, and ground plaster, in or about the proportions specified, and treated or prepared essentially as described.

GEORGE A. MARSH, JR.

Witnesses:
  M. L. MARSH,
  S. W. BRUNCK.